Jan. 25, 1938. L. GOLDHAMMER ET AL 2,106,374
FILM MAGAZINE
Filed Aug. 25, 1933
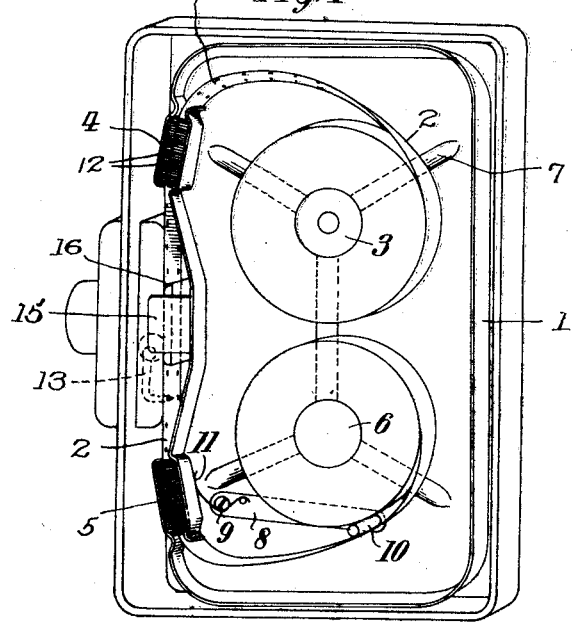
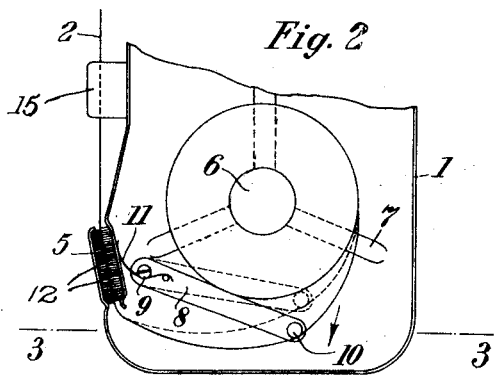
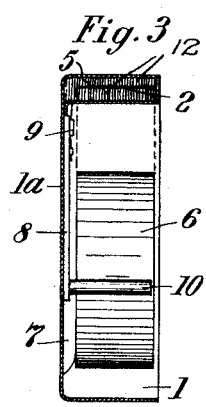
Inventors:
Leo Goldhammer,
Paul Froot,
Philip S. Hopkins.
By Attorney Patented Jan. 25, 1938

2,106,374

UNITED STATES PATENT OFFICE 2,106,374

FILM MAGAZINE

Leo Goldhammer, Munich, and Paul Frost, Munich-Neuharlaching, Germany, assignors to Agfa Ansco Corporation, Binghamton, N. Y., a corporation of New York Application August 25, 1933, Serial No. 686,848
In Germany August 25, 1932

5 Claims. (Cl. 242—71)

Our present invention relates to a film magazine.

The object of this invention is a magazine for use in cinematographic apparatus for films of a sub-standard size, in which the film is guided from the take-off to the take-up spool without forming a loop. It is known that in apparatus of this kind, operating without an arresting device for the film in the picture window, it is impossible to keep the film completely at rest without the provision of some compensating means. It has been proposed therefore to provide for a resilient compensation between the loaded or take-off spool and the exposure window as well as between the empty or take-up spool and the exposure window.

According to this invention this problem is solved by utilizing the inherent elasticity and the stiffness of the film itself to furnish an elastic compensation between the film wound on the take-off spool and the intermittent transport by the film claw on the one hand, and the continuous movement of the take-up spool and the intermittent movement of the film claw on the other hand. In order to bring into play the natural resilience of the film, the short openings for the entrance of the film into, and its exit from, the magazine, which openings are lined with plush to make them light-tight, are inclined to the front wall of the magazine, so that the portion of the film between the opening and the spool is not taut but lies free over a comparatively considerable length. Both the openings are arranged at such a distance from the upper wall and the lower wall of the magazine that the film, when exercising the compensation movement, does not come into contact with these walls, but moves freely.

To assist this resilient compensation, there is provided besides the take-up spool, a brake lever which is pressed by the film, as it runs on the spool, against the uppermost layer of the film already wound on the take-up spool and thus brakes the movement of the spool. In this manner the strain which is exerted on the film by the take-up spool is prevented from affecting the portion of the film which is passing the exposure window.

The accompanying drawing illustrates the invention.

Fig. 1 is a perspective view of the magazine, the lid of which has been removed.

Fig. 2 is a detailed view of the magazine, showing the take-up spool, and the brake lever in its different operative positions.

Fig. 3 is a section on line 3—3 of Fig. 2.

The drawing is more or less diagrammatic; thus, for instance, the inner coils of the wound film and the sets of perforations at the margin of the film are not represented.

In the magazine 1 the film 2, unwinding from the take-off spool 3, passes through the exit channel 4, lined with plush 12, to the exposure window, then enters the magazine again by the channel 5 and is wound on the take-up spool 6. Between the channels 4 and 5 the film is laterally guided by plates 15 and vertically by the picture gate 16 of conventional form. The front wall of the magazine is made in two parts, so that an intermediate part forms with the two ends of the front wall the channels 4 and 5. The film band is supported in known manner by ribs 7 fixed to the bottom 1a of the magazine, so that it rests only on these ribs, without touching the bottom 1a. On the bottom 1a there is pivoted at 9 a lever 8 carrying at its free end a guide or brake roller 10. By the spring 11 the roller 10 is constantly pressed against the film in the direction indicated by the arrow in Fig. 2.

The magazine operates as follows:

When the mechanism is in action the film is unwound from the take-off spool by an intermittently working feeding device as indicated at 13 in Fig. 1 and fed to the exposure window. Directly after or already during the feeding movement of the feeding device, the film, owing to its inherent elasticity and stiffness forms a loose loop as represented at 14 in Fig. 1. Therefore, the next jerky movement does not have to accelerate the whole mass of the take-off spool, but merely that portion of film that loosely lies about the film spool. In order to reduce friction on the film to a minimum the openings for the exit and the entrance of the film are of short length and are somewhat inclined towards the front of the magazine, so that any sharp bending of the film is avoided.

The operation of winding the film is analogous to that of unwinding it. By the claw 13 of conventional form the film band is drawn through the channel 5 and is wound on by the take-up spool 6. In order that, with the increasing diameter of the take-up spool, no more film is wound than is fed by the claw, the take-up spool is braked by the lever 8, that is to say at the end of the winding-on movement the roller 10 which lies between the last and the last but one coil, is pressed against the spool by the film (see the dotted position in Fig. 2). Shortly after the claw movement, however, the film, assisted by the lever 3, returns into the solid position indicated in Fig. 2.

What we claim is:

1. A film magazine of the character described comprising a casing having front, rear, bottom, top and end walls, a film-feeding spool and a film take-up spool mounted within said casing and respectively spaced from the opposite end walls thereof, means forming two film channels in the front wall of said casing, one adjacent each end thereof, said channels being slightly inclined with respect to said front wall to facilitate the feed of said film from said feeding spool outwardly through one of said channels and inwardly through the other to said take-up spool and being lined with a light-tight covering, the position and inclination of said channels with relation to the respective spools being such that the film in passing between said spools and the inner ends of the respective channels deviates from a line connecting the inner end of the respective channel and the surface of the adjacent one of said spools.

2. A film magazine for use in a camera without a sprocket drum which comprises a front wall, a rear wall, two end walls, an upper part and a bottom part forming together a substantially rectangular and substantially flat container, a film-feeding spool and a film take-up spool mounted on said bottom part of said container spaced from said end walls, said front wall being formed to provide two channels for the passage of the film from said film-feeding spool to said take-up spool, said channels being located one adjacent each end of said front wall and extending substantially perpendicular to the respective end walls so that their extensions cut each other outside of but closely adjacent the front wall of the magazine and being lined with a light-tight covering whereby the film in passing between said spools and the inner ends of said channels is caused to deviate from a straight line between said inner ends and the periphery of said spools.

3. A film magazine for use in a camera without a sprocket drum which comprises a front wall, a rear wall, two end walls, an upper part and a bottom part forming together a substantially rectangular and substantially flat container, a film-feeding spool and a film take-up spool mounted on said bottom part of said container spaced from end walls, said front wall being formed to provide two channels for the passage of the film from said film-feeding spool to said take-up spool, said channels being located one adjacent each end of said front wall and extending substantially perpendicular to the respective end walls and having their inner ends disposed nearer to said end walls than the axes of the respective feed and take-up spools, so that their extensions cut each other outside of but closely adjacent the front wall of the magazine and being lined with a light-tight covering whereby the film in passing between said spools and the inner ends of said channels is caused to deviate from a straight line between said inner ends and the periphery of said spools.

4. A film magazine of the character described comprising a casing having front, rear, bottom, top and end walls, a film-feeding spool and a film take-up spool mounted within said casing and respectively spaced from the opposite end walls thereof, means forming two film channels in the front wall of said casing, one adjacent each end thereof, said channels being slightly inclined with respect to said front wall to facilitate the feed of said film from said feeding spool outwardly through one of said channels and inwardly through the other to said take-up spool and being lined with a light-tight covering, the position and inclination of said channels with relation to the respective spools being such that the film in passing between said spools and the inner ends of the respective channels deviates from a line connecting the inner end of the respective channel and the surface of the adjacent one of said spools, a lever pivotally mounted at one end within said casing adjacent said take-up roll, said lever having a roller mounted at its free end, said roller being disposed between the film passing to said spool and the film wound thereon, and a spring normally pressing the roller end of said lever away from said take-up spool against the film strip passing thereto whereby said roller is moved against said film wound on said take-up spool to act as a brake only by reason of the tensioning of the film passing to said take-up spool.

5. A film magazine for use in a camera without a sprocket drum which comprises a front wall, a rear wall, two end walls, an upper part and a bottom part forming together a substantially rectangular and substantially flat container, a film-feeding spool and a film take-up spool mounted on said bottom part of said container spaced from said end walls, said front wall being formed to provide two channels for the passage of the film from said film feeding spool to said take-up spool, said channels being located one adjacent each end of said front wall and extending substantially perpendicular to the respective end walls so that their extensions cut each other outside of but closely adjacent the front wall of the magazine and being lined with a light-tight covering, whereby the film in passing between said spools and the inner ends of said channels is caused to deviate from a straight line between said inner ends and the periphery of said spools, a lever pivotally mounted at one end within said casing adjacent said take-up roll, said lever having a roller mounted at its free end, said roller being disposed between the passing to said spool and the film wound thereon and a spring normally passing the roller end of said lever away from said take-up spool against the film strip passing thereto whereby said roller is moved against said film wound on said take-up spool to act as a brake only by reason of the tensioning of the film passing to said take-up spool.

LEO GOLDHAMMER.
PAUL FROST.